United States Patent [19]

Davenport et al.

[11] Patent Number: 5,526,237
[45] Date of Patent: Jun. 11, 1996

[54] LIGHTING SYSTEM FOR INCREASING BRIGHTNESS TO A LIGHT GUIDE

[75] Inventors: John M. Davenport, Lyndhurst; Richard L. Hansler, Pepper Pike; Gary R. Allen, Chesterland; Thomas G. Parham, Gates Mills, all of Ohio

[73] Assignee: General Electric Company, Schenectady, N.Y.

[21] Appl. No.: 165,769

[22] Filed: Dec. 10, 1993

[51] Int. Cl.⁶ ................................. F21V 7/08; F21V 8/00
[52] U.S. Cl. ............................. 362/32; 362/237; 362/241; 362/255; 362/298
[58] Field of Search ..................... 362/32, 227, 228, 362/234, 235, 248, 255, 263, 297, 298, 346, 237, 240, 241, 243; 313/113, 114

[56] References Cited

U.S. PATENT DOCUMENTS

| | | | |
|---|---|---|---|
| 4,089,047 | 5/1978 | Luderitz | 362/297 |
| 4,425,604 | 1/1984 | Immai et al. | 362/240 |
| 5,016,150 | 5/1991 | Gordin et al. | 362/263 |
| 5,099,399 | 3/1992 | Miller et al. | 362/32 |
| 5,239,230 | 8/1993 | Mathews et al. | 313/571 |
| 5,317,484 | 5/1994 | Davenport et al. | 362/346 |

FOREIGN PATENT DOCUMENTS

| | | | |
|---|---|---|---|
| 25150 | 9/1922 | France | 362/298 |
| 760772 | 12/1933 | France | 362/255 |
| 460022 | 4/1928 | Germany | 362/240 |
| 1072573 | 1/1960 | Germany | 362/235 |
| 1189489 | 3/1965 | Germany | 362/241 |

*Primary Examiner*—Denise L. Gromada
*Assistant Examiner*—Y. Quach
*Attorney, Agent, or Firm*—George E. Hawranko; Stanley C. Corwin

[57] ABSTRACT

A light source includes an integral reflective coating on a portion of its envelope for reflecting light back through the source. The light from the source is directed by a reflector toward a focus thereof at which is located an input end of a light guide. The integral reflective coating allows a half ellipsoidal reflector to be used in one embodiment without depreciable loss of light. Accordingly, a pair of light sources can be arranged with a common focus to substantially double the brightness in the light guide. Alternatively, the light sources can provide a primary and redundant arrangement, or used to provide two levels of light in another arrangement. According to another embodiment, a hemispherical reflector is used to obtain unit magnification and increase the angular range through which light may enter the light guide.

10 Claims, 3 Drawing Sheets

LIGHTING SYSTEM FOR INCREASING BRIGHTNESS TO A LIGHT GUIDE

BACKGROUND OF THE INVENTION

This invention pertains to the art of lighting systems and more particularly to lighting systems employing a receptive component such as a light guide etc. The invention is particularly applicable to arrangements requiring an increase in brightness in the light guide and will be described with particular reference thereto. However, it will be appreciated that the invention has broader applications and may be advantageously employed in other environments and applications. For example, the arrangement can also be used where a backup, or redundant, light source is required. Still another use of the lighting system finds application where two distinct levels of light brightness are required. Examples of different applications requiring high brightness include automotive headlight projection systems and LCD TV projection systems. These systems utilize a lens rather than a light guide as a light receptive component.

Recent developments confirm an increased emphasis and trend to use light guides or light conductors in various lighting systems. The benefits offered by such an arrangement, for example the ability to centralize a single light source and provide light via the light guides to a number of remote locations, suggests that an increased emphasis in use of this technology is warranted.

A low wattage light source is preferred for the light source because of the an ever increasing demand for efficiency, but simultaneously a need still exists to increase the brightness level at the input end of the light guide. That is, brightness, which is defined as the number of lumens per unit area per unit solid angle, on the order of 5,000 lumens per centimeter squared or higher is desired for certain applications. For example, such a high brightness level is desired for use in an automotive headlamp.

Another competing goal from a practical standpoint is to minimize the size of the light guide. Thus, if the cross-sectional area of the light guide is minimized, a greater amount of light must be provided to the input end of the light guide in order to maintain a predetermined brightness for the lighting system. Stated another way, the amount of light carried by the light guide must be relatively large. One way this can be accomplished is by increasing the effective brightness of the light source and concentrating the light into a smaller cross-sectional area.

Yet another important feature desired by a designer for selected applications is to provide redundancy to the lighting system. Although redundancy is not a crucial factor in all lighting systems, in others it becomes highly critical and of major importance. For example, where a single, primary light source fails and the consequences of such failure are of great concern, a low cost and effective redundant arrangement is desired.

Still other lighting systems require periodic switching between two distinct light levels. One typical example is providing high and low beam in an automotive headlamp. It is contemplated that these brightness levels could be obtained in a number of different ways. According to a first arrangement, switching or regulating the light (i) at the light source, (ii) through the light guide, or (iii) at the output end of the light guide could be incorporated into the light guide assembly. Commonly assigned application Ser. No. 08/018, 852 (LD 10094) U.S. Pat. No. 5,408,552 discloses various embodiments for switching between first and second light levels as desired for a particular end use. A second arrangement applicable here, and to be described in greater detail below, is to use multiple light sources to provide the distinct levels of light brightness. Accordingly, it has been deemed advantageous to provide a lighting system that effectively increases brightness to a light guide and offers the flexibility of alternative uses as described above.

SUMMARY OF THE INVENTION

The present invention provides a lighting system that increases the brightness level to a light guide, provides a redundant light source arrangement, or provides multiple levels of light in a single light guide.

According to the invention, the lighting system includes first and second light sources each having an integral reflective surface provided on a portion of the light source envelope. First and second reflective surfaces are located adjacent the light sources and receive light therefrom, respectively, directing the light toward a common, input end of a light guide. According to another aspect of the invention, the reflective surfaces may be either ellipsoidal or hemispherical in conformation.

According to still another aspect of the invention, the light sources may be identical or different in construction, depending on system requirements.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
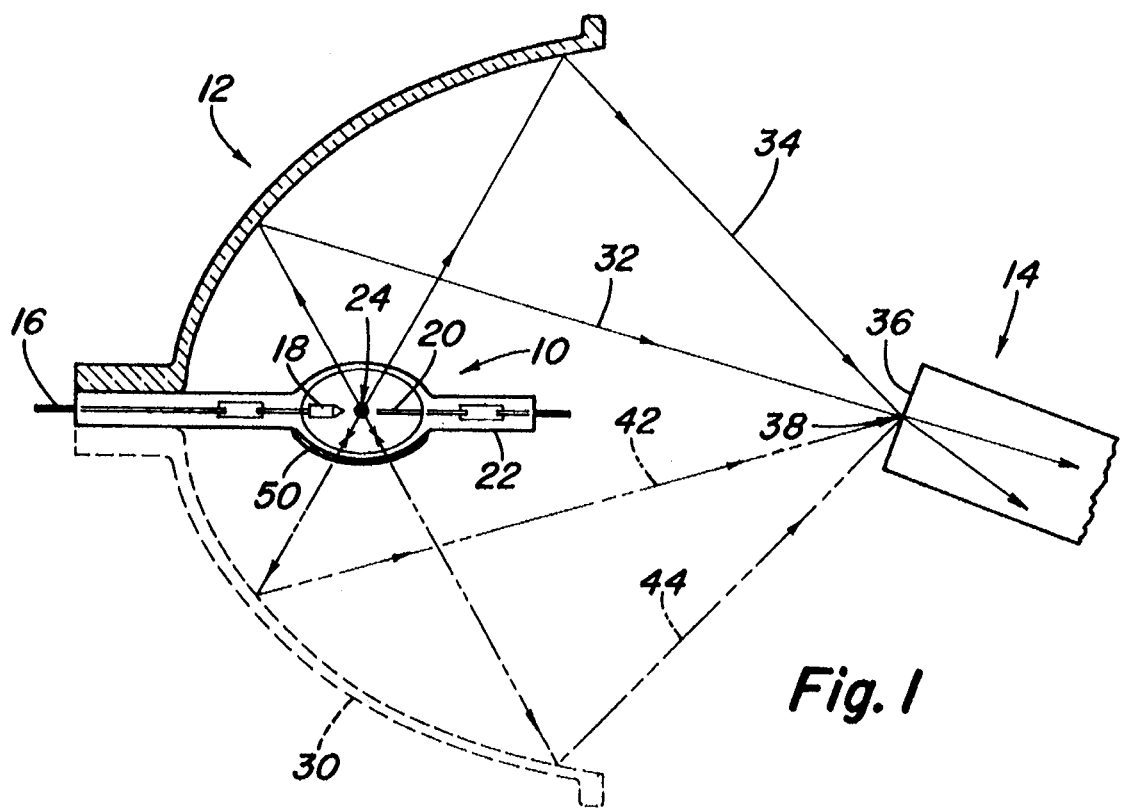
FIG. 1 is an elevational view partly in cross section of a portion of the subject lighting system.

Referring now to the drawings wherein the showings are for purposes of illustrating the preferred embodiments of the invention only and not for purposes of limiting same, the FIGURES show one or more light sources 10 that direct light to one or more reflectors 12 which, in turn, direct the light toward a light guide or light conductor 14.

More particularly, and with reference to FIG. 1, the light source 10 is illustrated as an arc discharge lamp source, such as a low wattage metal halide lamp source, receiving electrical current through line 16 from an associated electrical source (not shown). Of course still other types of light sources may be used without departing from the scope and intent of the subject invention.

The arc discharge lamp includes a pair of spaced electrodes 18, 20. As is well known in the art, the electrodes are contained within an envelope 22, such as a quartz material, that is transparent to visible light and contains a pressurized gas comprising a mixture of metal halide, mercury, and inert gas. Light is emitted from the arc gap 24 defined between the electrodes and directed outwardly through the envelope.

The light from the discharge arc is directed by suitable optics into an input end of a light guide. These known optical arrangements often use a reflector, such as an ellipsoidal reflector, comprised of reflector 12, shown in solid line, and reflector portion 30, shown in phantom. The reflector portion is essentially a mirror image of the reflector 12 which in combination define an optical component that focuses light from the light source located at a first focus on to a second focus. Thus as schematically illustrated, light rays 32, 34 are directed upwardly and outwardly from the arc gap 24 and pass outwardly through the envelope 22. The light rays are reflected by reflector 12 and focused at input end 36 of the light guide. The input end of the light guide is advantageously located at the second focus 38 of the ellipsoidal reflector 12, 30 so that the light is collected and transmitted by the light guide through known principles of internal reflection to a desired remote location or end use (not shown).

Of course, light rays 32, 34 are merely representative of a portion of the total light emitted from the discharge arc. Light rays 42, 44, shown in phantom, are representative of still other light that is emitted from the light source in a typical lighting system. These light rays are illustrated as being directed outwardly from the light source and reflected by reflector portion 30 toward the second focus Thus in known arrangements, the full ellipsoidal reflector comprised of portions 12 and 30 focuses the light at the input end of the light guide.

For various reasons, and dependent upon the expected end use of the light provided to the light guide 14, it is important to increase the brightness or intensity of the light provided to the light guide. Commonly assigned U.S. Pat. No. 5,239,230 discloses a discharge arc to an arctube that exhibits a high brightness level and addresses one solution for increasing the light provided to the light guide, i.e. increase the brightness of a single light source. The subject invention, though, is directed to increasing the brightness level at the input end of the light guide by other means irrespective of the upper range of light intensity or brightness of light provided by an individual discharge light source.

Specifically, the envelope 22 of the arc discharge lamp is provided with an integral reflector means As shown in FIG. 1, in the preferred embodiment the integral reflector means is defined by a reflective coating on a portion of the surface of the envelope. For example, approximately one-half of the surface area of the envelope is coated with the integral reflector means in order to redirect light from the arc gap back into the gap where it is then eventually emitted through the non-coated portion of the envelope. The integral coating may be formed in a number of ways, such as coating the entire envelope and subsequently scraping regions of the coating, or masking selected regions during the coating process so that the selected regions can be easily and effectively removed. Details of a preferred integral reflector coating and method of forming the coating are described in commonly assigned patent application Ser. No. 08/165,447 (LD 10295), details of which are incorporated herein by reference.

By including the integral reflector means 50 or reflective coating 50 on the envelope, the ellipsoidal reflector portion shown in phantom can be eliminated. Only the half ellipsoidal reflector portion 12 is required to direct the light from the light source 10 to the input end of the light guide. Thus, the light represented by light rays 42, 44 that typically contacted the reflector portion 30 is now redirected back through the arc gap after contacting the integral reflector coating, passes through the envelope, is reflected off of the half ellipsoidal reflector portion 12, and directed to the second focus 38 which coincides with the input end of the light guide. A much more compact arrangement results without any substantial loss in light directed into the light guide. Preferably, if the arc gap is small relative to the dimension of the envelope, the size of the image formed by reflection from the integral reflective coating 50 will be essentially the same as the source itself.

Figure 2:
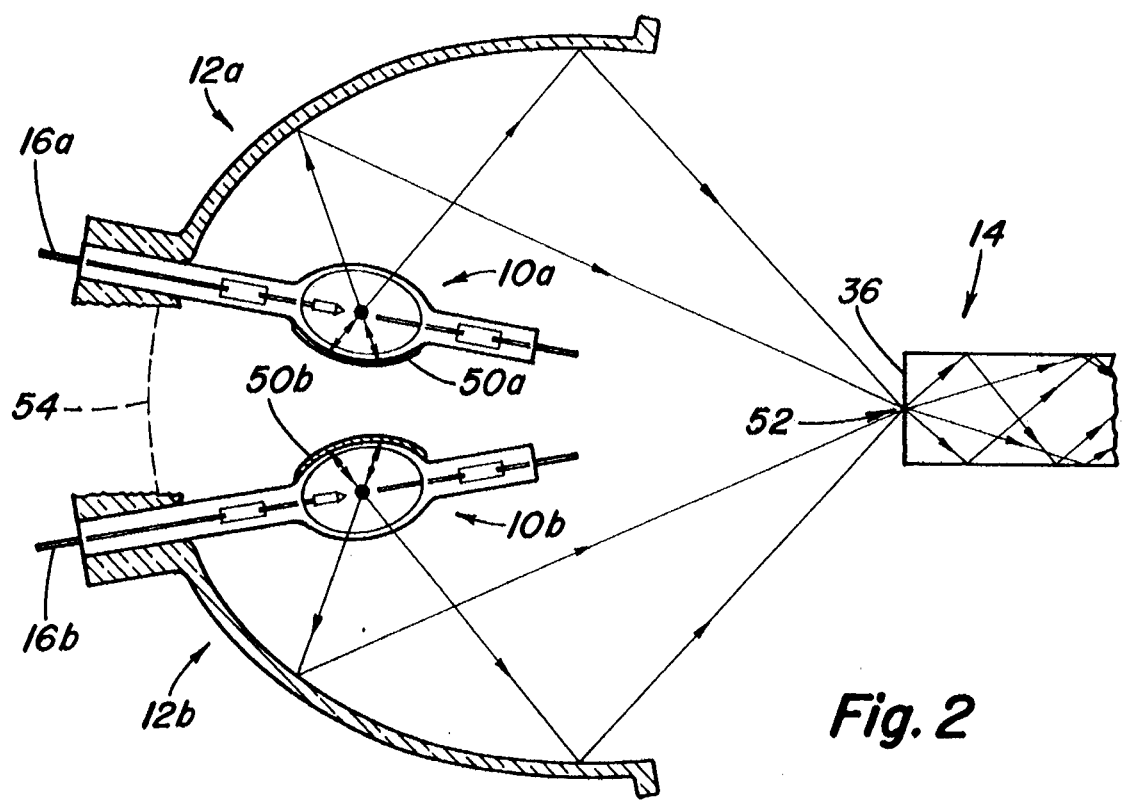
FIG. 2 discloses one preferred embodiment of a dual light source in accordance with the subject invention.

As shown in FIG. 2, a pair of reflectors 12b, substantially identical unless noted otherwise, are associated with respective light sources 10a and 10b. Each of the light sources includes an integral reflector means 50a, 50b as described above so that light is directed back through the arc gap of the respective light sources. Again, each of the light sources 10a and 10b is placed at a first focus of the respective reflectors 12a and 12b. Moreover, the reflectors 12a, 12b are oriented so that the second focus of each reflector is merged with the other to define a common focus 52 disposed at the input end 36 of the light guide. Since each light source provides a predetermined brightness level at the common focus 52, the combination of the pair of light sources effectively doubles the brightness provided to the light guide. This is advantageously achieved with only a slight increase in the overall angle through which light is introduced to the input end of the light guide. Thus, a large amount of light, including light originally directed outward from the arc discharge, as well as the light reflected back through the arc gap by the integral reflective coatings 50a, 50b, provides for the desired increase, almost a doubling, in the brightness at the input end of the light guide. Since the arc discharge is essentially transparent to its own radiation, i.e., it is optically thin, essentially all of the light reflected by the integral reflector coatings 50a, 50b is directed toward the respective reflectors 12a, 12b and eventually enters the light guide. Moreover, the color pattern is reversed when reflected off the integral reflective coatings. Thus, a better mixing of color is achieved by the overall light received from each ellipsoidal reflector portion.

As represented by phantom line 54 in FIG. 2, the above-described separate reflectors 12a, 12b may be defined by a single reflector having two distinct reflective portions 12a, 12b. The subject invention is intended to be broadly construed as being directed to a single reflector having separate portions with their own first foci and a common second focus to handle light from the respective sources, or two distinct reflectors.

As will be understood by one skilled in the art, both light sources may be used at the same time to effectively increase the brightness or intensity of light input to the light guide. Alternatively, one of the light sources can act as a backup or redundant light source. Suitable means for monitoring the light output from one light source, for example, a light sensor in light guide 14, could provide a signal responsive to a "no light" situation and thus switch or provide electric current to line 16b associated with the second light source 10b. This will provide an effective and simple redundant arrangement for the lighting system as may be required for particular arrangements.

Moreover, the plural light sources can be used where two distinct light levels are required. Again, and by way of example only, a high beam/low beam arrangement such as used in an automotive headlamp is one such use. The low beam arrangement would be supplied through use of a single light source, e.g., 10i a, and combined with the additional light from the second light source, e.g., 10b, where a high beam is required. Suitable switching and control mechanisms could provide such a high beam/low beam arrangement on demand. Of course, still other end uses are contemplated within the scope and content of the subject invention and that employ the basic concepts and structure described above.

Figure 3:
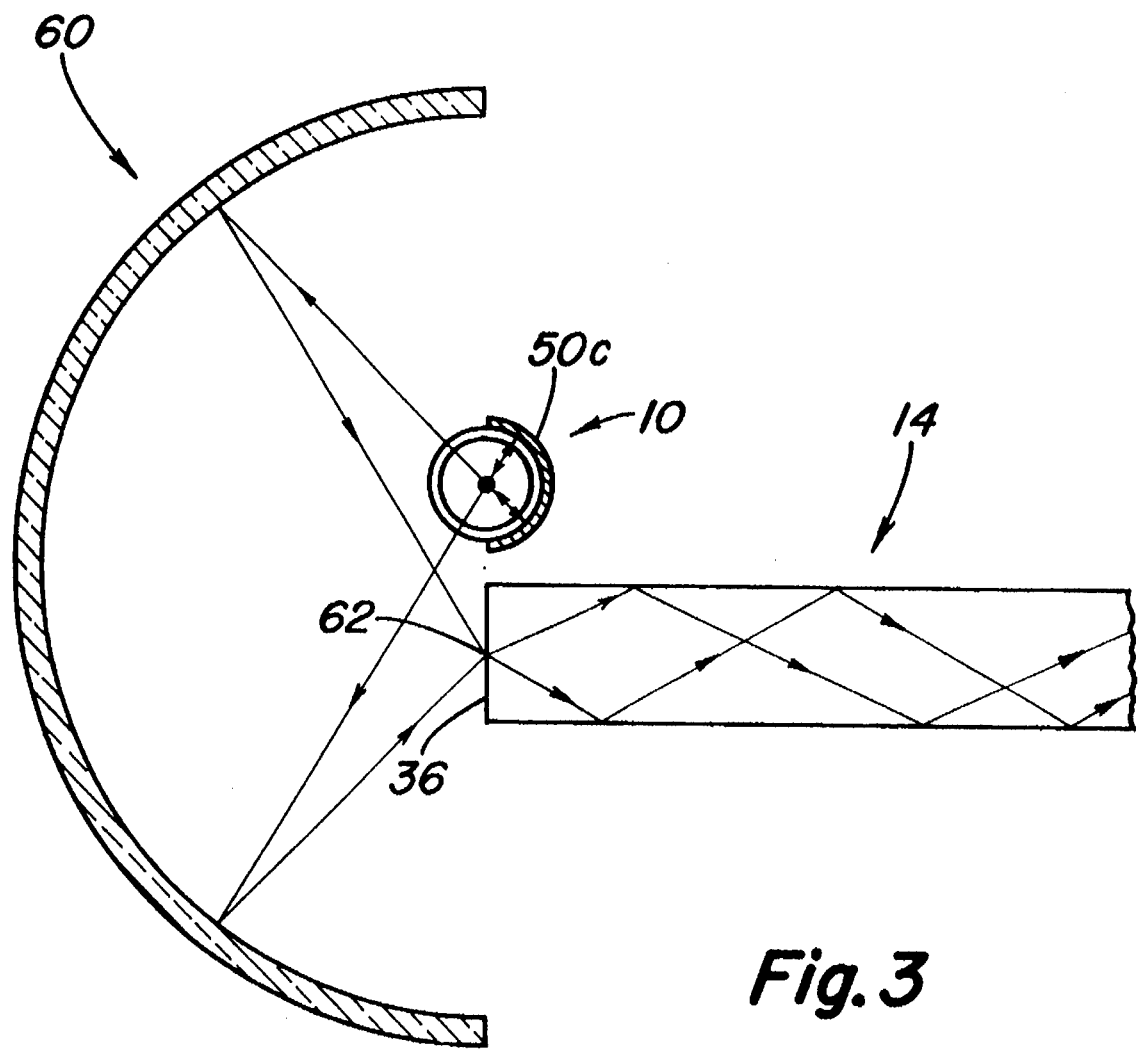
FIG. 3 illustrates an alternate embodiment using a hemispherical reflector.

As illustrated in FIG. 3, the combination of a light source 10, an integral reflector means provided by the coating 50c, reflector and light guide 14 need not be limited to an ellipsoidal reflector arrangement. As shown in FIG. 3, a hemispherical reflector 60 receives light from the light source 10 and directs the light to focus 62. Again, the input end 36 of the light guide is located at the focus to receive the maximum amount of light therein. The hemispherical reflector 60 beneficially provides unit magnification of the light where the light source is mounted adjacent to, but spaced from, the focus of the reflector 60. The hemispherical reflector also allows light to enter the light guide through the full two pi angle as shown.

Figure 4:
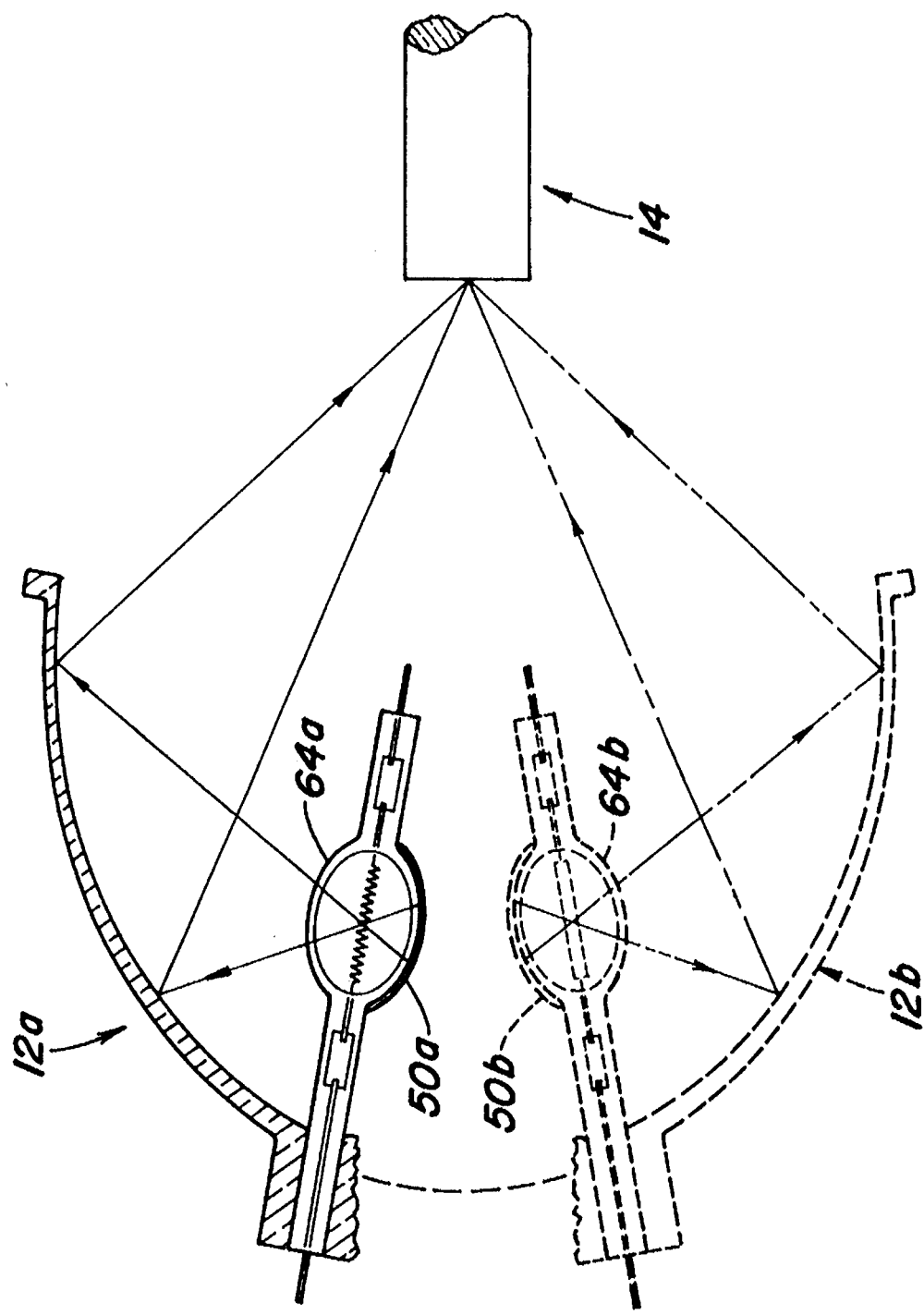
FIG. 4 illustrates an elevational view partly in cross section of a portion of the subject lighting system including one or two incandescent light source(s)

It will be additionally recognized that although the light sources are shown as a pair of arc discharge lamps, that still other types of light sources may be used. For example, an incandescent light source (64a) as shown in FIG. 4, or still other light sources, may be suitable for some arrangements. In virtually all other respects, the remainder of the lighting system remains unchanged from that previously described and operates in substantially the same manner.

If an incandescent light source is used, it may be preferred that the integral mirror be formed so that a proper angular relationship is maintained whereby the light is effectively directed back through the source. For example, the filament may be mounted off-axis relative to the remainder of the envelope. Since the filament is only partially transparent, i.e., the space between turns of the filament are transparent, light is effectively collected and directed back through the central portion of the envelope without any adverse loss of light by using an off-axis filament mounting arrangement.

Still further, although the prior description of the FIG. 2 embodiment discloses a pair of identical light sources, it will be understood that one light source may be different from the other. An arc discharge lamp may be the primary source and an incandescent lamp could be the secondary source. Again, such an arrangement would be suitable for any of the various uses described above to increase the amount of light that enters the light guide, to provide a backup light source, or provide two levels of light.

The invention has been described with reference to the preferred embodiments. Obviously, modifications and alterations will occur to those upon a reading and understanding of this specification. It is intended to include all such modifications and alternations insofar as they come within the scope of the appended claims or the equivalents thereof. Another application environment may utilize a light receptive component such as a lens rather than a light guide.

What we claim as new and desire to secure by Letters Patent of the United States is:

1. A lighting system comprising:
   first and second light sources each having an envelope through which light passes, the envelopes each having a selected region coated with reflective material to direct light back through the respective light source;
   first and second generally ellipsoidal reflective surfaces, each of said first and second light sources being located at a respective focal point of the respective reflective surface; at least one of said reflective surfaces being oriented relative to the other of said reflective surfaces to thereby enable said reflective surfaces to direct the light received from said light sources toward a common focal point to maximize the light brightness; and
   a light guide having an input end disposed at the common focal point to receive light from the first and second reflective surfaces.

2. The lighting system as defined in claim 1 wherein both of the light sources are one of arc discharge and filament lamps.

3. The lighting system as defined in claim 1 wherein one of the first and second light sources is an incandescent light source.

4. A lighting system comprising:
   a light source in a closed envelope emitting light outward through at least a first portion of the envelope;
   an integral reflective coating on a second portion of the envelope receiving light from the light source and directing the light back through the light source;
   a partial-ellipsoidal reflector element, the light source being located at a first focal point of the partial-ellipse reflector element thereby enabling the partial-ellipsoidal reflector element to, receive light from the light source and direct the light toward a second focal point of the reflector element; and
   a light guide having an input end at the second focal point for receiving light from the reflector element.

5. The lighting system as defined in claim 4 further comprising a second light source and a generally ellipsoidal reflector element for directing light to the input end of the light guide.

6. The lighting system as defined in claim 5 wherein the second light source is enclosed in an envelope, the envelope having an integral reflective coating for directing light back through the second light source.

7. The lighting system as defined in claim 5 wherein the generally ellipsoidal second reflector element has an elliptical conformation wherein a first focal point thereof is located at the second light source and a second focal point thereof is located at the input end of the light guide.

8. The lighting system as defined in claim 4 wherein the light source is a discharge light source in which an arc gap thereof is minimized relative to a radius of the light source envelope.

9. A lighting system for increasing the brightness in a light guide, the system comprising:
   first and second light sources, each light source including an envelope having an integral reflective portion that reflects light back through the light source;
   a reflector having first and second partial-ellipsoidal portions, a first and second light sources being located at the first focal point of the first and second partial-ellipsoidal portions, respectively, each partial-ellipsoidal portion thereby receiving light from one of said light sources and directing the light toward a second common focal point;
   a light guide having an input end disposed at the common focal point to receive light reflected from said partial-ellipsoidal portions.

10. The lighting system as defined in claim 9 wherein the first and second light sources are both arc discharge sources.

* * * * *